Aug. 25, 1925.

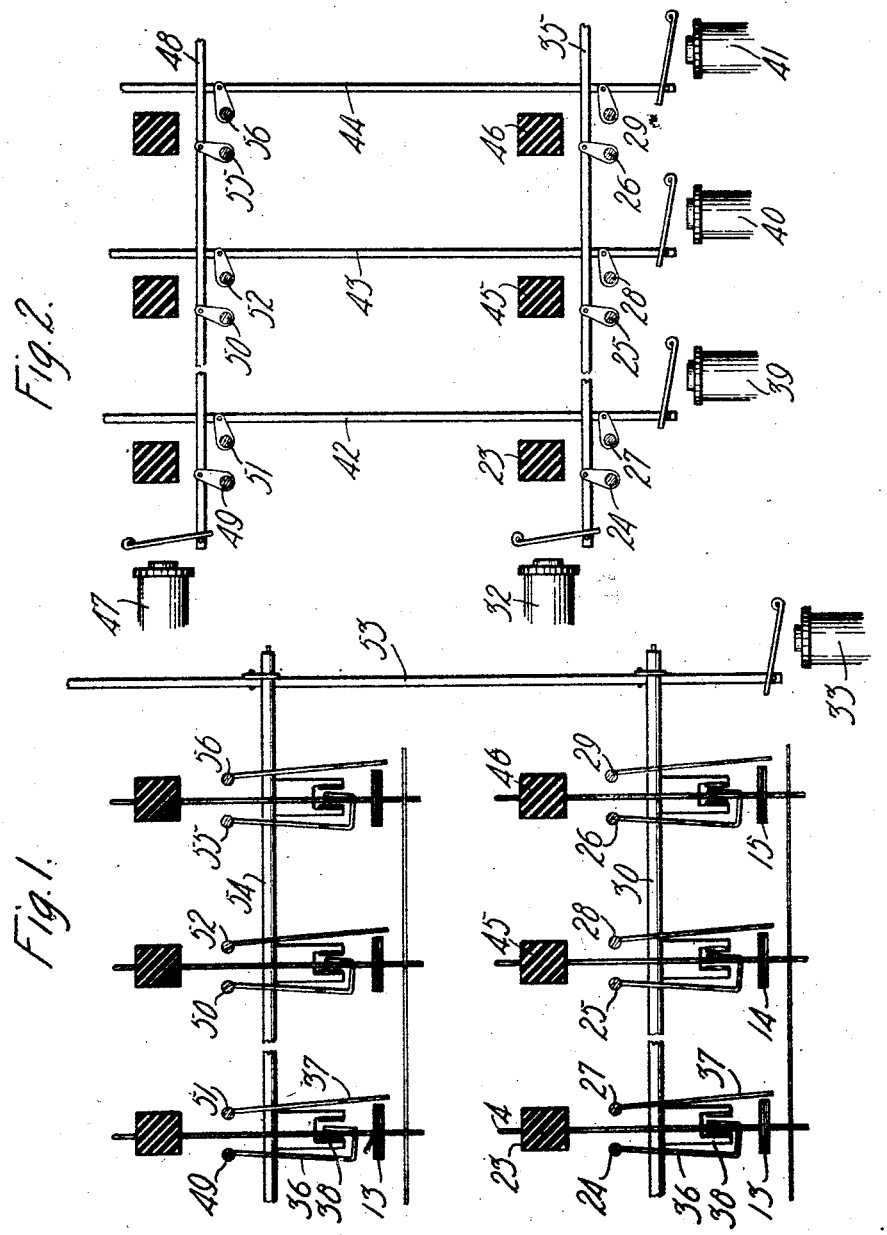

M. B. KERR 1,550,819

AUTOMATIC SWITCHING DEVICE

Filed July 12, 1923 3 Sheets-Sheet 2

Inventor:
Mark B. Kerr,
by Ew.o.d... Atty.

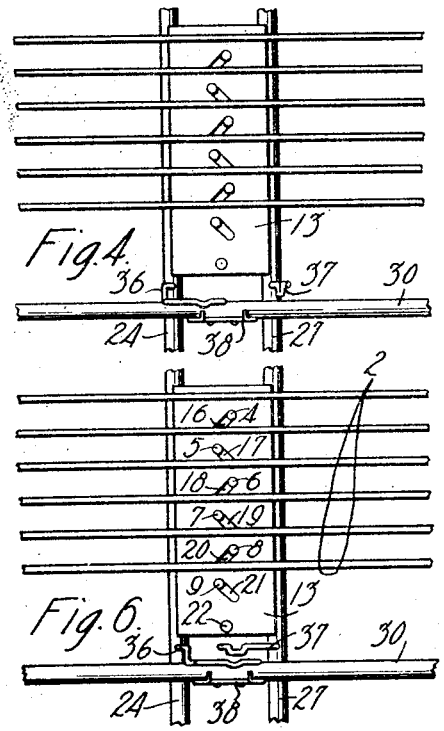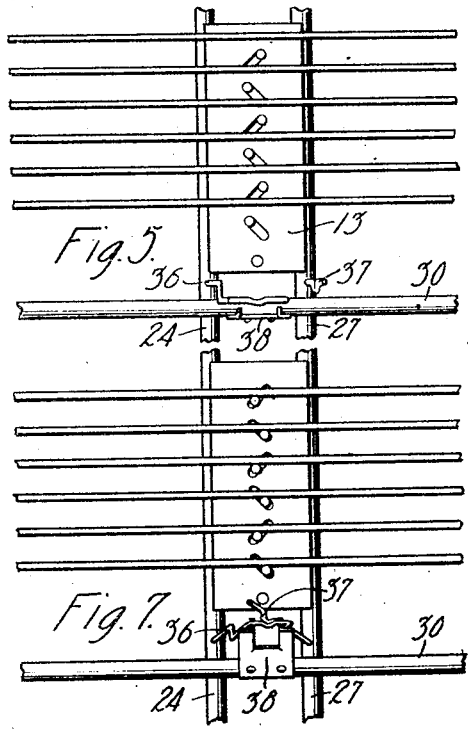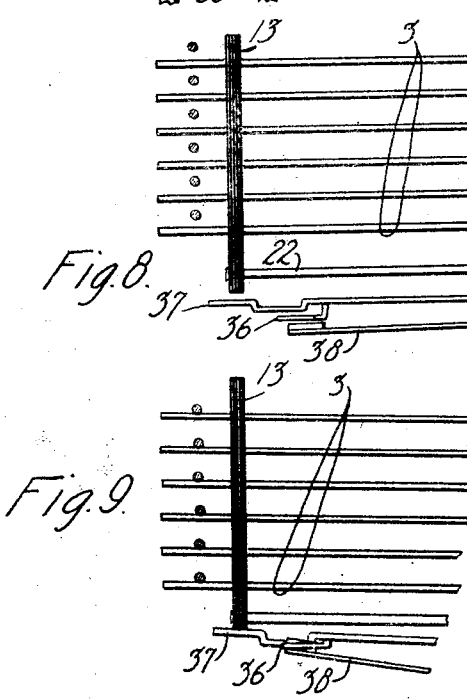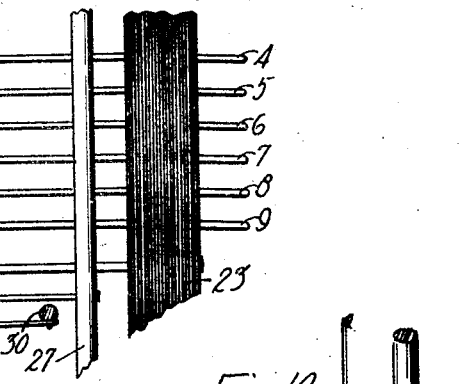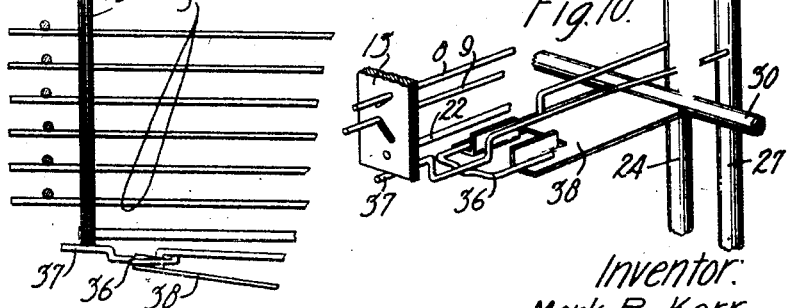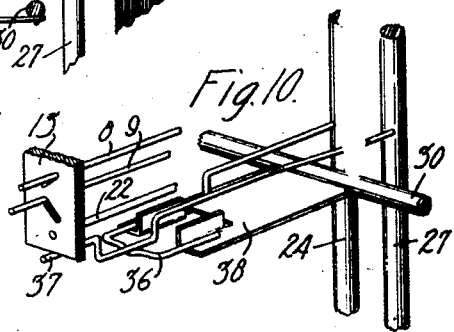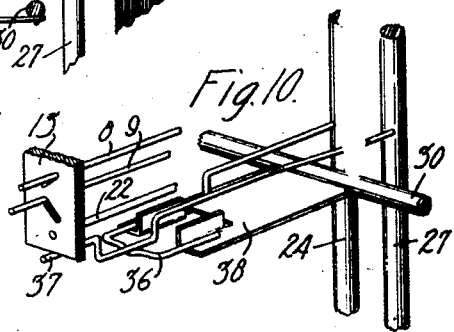

Patented Aug. 25, 1925.

1,550,819

UNITED STATES PATENT OFFICE.

MARK B. KERR, OF ROSEBANK, NEW YORK, ASSIGNOR TO WESTERN ELECTRIC COMPANY, INCORPORATED, OF NEW YORK, N. Y., A CORPORATION OF NEW YORK.

AUTOMATIC SWITCHING DEVICE.

Application filed July 12, 1923. Serial No. 651,058.

*To all whom it may concern:*

Be it known that I, MARK B. KERR, a citizen of the United States of America, residing at Rosebank, in the county of Richmond, State of New York, have invented certain new and useful Improvements in Automatic Switching Devices, of which the following is a full, clear, concise, and exact description.

This invention relates to automatic switching devices and more particularly it has to do with the application of such devices to telephone exchange systems.

The object of the invention is an improved electrical switching mechanism by means of which a comparatively large number of connections may be set up in a simple and efficient manner.

A feature of the invention relates to a structure having a plurality of sets of operating bars arranged in groups with magnets each operating an entire group of one set and other magnets each operating a bar in each group of another set, together with means cooperating with said bars to actuate circuit-making contacts.

Another feature relates to the provision of a switching device of the above described character to establish connections for governing the operation of automatic selective switches.

Such other and further features as are contemplated by the present invention will become apparent from the following detailed description and also from the appended claims.

Referring to the drawing, Fig. 1 is a top elevation and also a sectional view of the switching structure taken on the line 1—1 of Fig. 3.

Fig. 2 is a similar view taken on the line 2—2 of Fig. 3.

Figs. 4, 5, 6 and 7 are enlarged detailed elevations showing the operating elements in their several stages of operation.

Fig. 8 is a detail side elevation showing the contact wires in their normal inoperative position.

Fig. 9 is a similar detail showing the contact wires in their operative condition.

Fig. 10 is a perspective view illustrating the relative positions of the operating elements.

Figure 3:
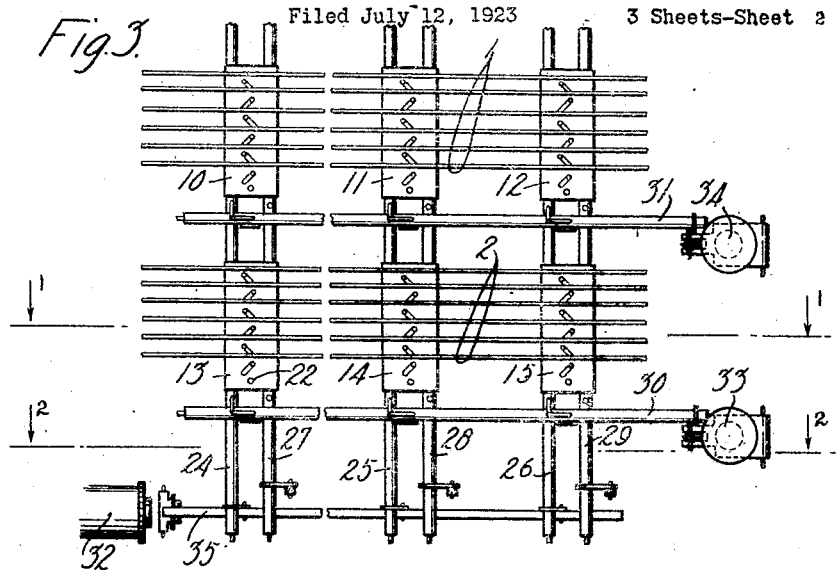
Fig. 3 is a front elevation showing a portion of the switch structure and contact back.

The switching device embodying the features of this invention is one which preferably involves the coordinate principle of selection and operation. A plurality of sets of operating members or bars are provided which when actuated in coordination determine the selection and operation of the desired circuit making contacts. The switch may, for example, have a capacity of 1000 sets of contacts. These sets of contact serve, according to the purpose for which the mechanism is employed in Fig. 11, to establish a large number of different circuit connections. Each of these connections, in effect, amounts to a numerical or other registration whereby automatic selector switches are controlled accordingly, to make selections of trunks and lines. The circuit connections established by the switch are accomplished by means of contacts which comprise bare wires, some being passive and others being active. The active wires are advanced into engagement with the passive wires by means of the cooperating bars. Other types of circuit making contacts may be employed if desired instead of the wire contacts.

A detail description will now be given of the construction and method of operation of the switch.

The structure comprises three sets of operating or switching members which, in the present embodiment, take the form of rotatable bars. The first set consists of bars 24, 25, 26, 49, 50, 55, etc. These bars may be arranged in ten different groups, each group comprising ten bars. For instance, the first group consists of the ten bars 24, 25, 26, etc., whereas the second group consists of ten bars 49, 50, 55, etc., and similarly for the remaining groups. The ten bars 24, 25, 26, etc., of the first group are arranged in parallel relation and each is linked to a connecting rod 35. The rod 35 is arranged to be moved longitudinally by means of the operating magnet 32 whereby all associated bars are rotated in a counter-clockwise direction as seen in Figs. 1 and 2.

In a similar manner the second group of bars are arranged in parallel relation to each other and adjoin to the connecting rod 48 which is under the control of the operating magnet 47. For the purpose of distinguishing the bars of this set, namely, the bars 24, 25, 26, etc., and the bars 49, 50, 55, etc., from other bars to be mentioned hereinafter, they may be denominated as the A-bars.

In addition to the A-bars there is provided a second set of operating members which may be called the B-bars. This set is likewise arranged in groups corresponding to the grouping of the A-bars and they are also disposed in parallel relation therewith. The first group of ten B-bars 27, 28 and 29 are shown each disposed in proximity to corresponding A-bars. Similarly, the second group of B-bars, three of which bars 51, 52 and 56 are disclosed, are arranged in proximity to the second group of corresponding A-bars. The same relation holds with respect to the remaining groups. For actuating the B-bars there are provided ten horizontal connecting rods 42, 43, 44, etc., each of which is drawn longitudinally by means of individual operating magnets 39, 40 and 41. The rod 42 is mechanically linked to a single B-bar in each of the ten groups including the bars 27 and 51 of the first two groups illustrated. Similarly, rods 43 and 44 are respectively linked each to a single B-bar in each of the ten different groups. Whenever one of the operating magnets 39, 40 and 41 is energized, the corresponding connecting rod is drawn longitudinally resulting in the rotation of a single B-bar in each of the different groups in the structure.

A third set of operating members is provided comprising a plurality of rotatable bars. For convenience in differentiation these latter elements will be known as the C-bars. There may be ten of these C-bars in a group, one for each of the ten groups of A-bars and B-bars. Two of these bars 30 and 54 are illustrated in Fig. 1 and are mechanically linked to a connecting rod 53 which is actuated by means of the operating magnet 33. The result of energizing the magnet 33 is to draw the rod 53 longitudinally, whereby all of the ten bars are rotated. One of a second group of C-bars 31 is also illustrated in Fig. 3.

Each of the several A-bars is provided with ten flexible fingers 36 properly spaced along the length of the bar, which relate correspondingly to ten different sets of circuit making contacts hereinafter to be described. In Fig. 4 the flexible finger 36 on the A-bar 24 is shown in its normal inoperative position.

Correspondingly, each of the B-bars is equipped with ten flexible fingers 37 similarly spaced, also representing as many different sets of circuit making contacts. In Fig. 4 the flexible element 37 is illustrated in its normal condition.

Each of the different C-bars is provided with ten rigid levers 38, there being one of these to cooperate with each pair of flexible fingers 36 and 37. Similarly, Fig. 4 shows the lever 38 of the C-bar 30 in its normal condition.

Attention will now be given to the contact making portion of the switch whereby any one of the thousand circuit connections may be established with a mechanism having the capacity assumed herein, by way of example. Referring to Fig. 3 particularly, six horizontal wires 1 constitute a set of passive contacts which represent a circuit. The six horizontal wires 2 constitute another set of passive contacts which may represent either the same or a different circuit according to the application of the structure. Likewise, other sets of passive contacts are provided for the switch in accordance with the grouping of the bars illustrated in Figs. 1 and 2 and previously described.

For cooperating with the stationary or passive contacts are a plurality of sets of active wire contacts 3. These movable wire contacts are supported on the switch frame by means of insulating blocks 23, 45, 46, etc. They extend as shown in Figs. 3, 4, 5, 6, and 7 through diagonal slots in insulating cards 10, 11, 12, 13, 14, 15, etc., to a point where they cooperate with the multipled wires of the passive sets 1 and 2. In Fig. 6 the individual wires 4, 5, 6, 7, 8 and 9 of set 3 are shown projecting through respective slots 16, 17, 18, 19, 20 and 21. The insulating card 13, for instance, is supported by means of a flexible spring 22 which is secured to the block 23. Normally, the tendency of the spring 22 is to hold the card 13 downwardly, retaining the several flexible conductors 3 in a position out of contact with the corresponding passive conductors 1 as shown in Fig. 8.

Considering the operation of the switch it will be assumed that it is desired to effect a connection between the circuit represented by the passive contacts 2 and the circuit represented by the set of active contacts 3 shown in the lower left-hand corner of Fig. 3. The circuit represented by the active contacts 3 is seen to appear in the group controlled by the bars 24, 27 and 30. Hence by any suitable means the operating magnet 32 is energized to attract its armature and move the connecting rod 35. This results in the rotation of the A-bars 24, 25, 26, etc. The A-bar 24 in rotating carriers all of its flexible fingers 36 to a point beneath the center of the corresponding insulating cards 10, 13, etc. The relative position of the several elements at this point of the operation is illustrated by Fig. 5.

During the time that magnet 32 is maintaining the rod 35 in its set position, the magnet 39 is operated. Magnet 39 moves the connecting rod 42 whereby the B-rods 27, 51, etc., one in each group are rotated. The rod 27 in rotating carries all its flexible fingers 37 thereon beneath the corresponding insulating cards 10, 13, etc. The particular flexible finger 37 associated with the finger 36 which has just been positioned by the A-bar 24 assumes a position in line with such finger 36 as best illustrated in Fig. 6 in the drawing.

The next step in the operation is to energize the magnet 33 which draws the connecting rod 53 forward, rotating the C-bars 30, 54, etc. The rotation of the bar 30 tilts the several rigid levers 38 thereon upwardly. The lever 38 associated with the positioned flexible fingers 36 and 37 encounters the finger 36 in the manner clearly shown in the perspective view of Fig. 10. On the continued upward movement of the lever 38 after having engaged the flexible finger 36, said finger 36 engages the flexible finger 37 and moves the same upwardly. The finger 37 in its upward movement engages the lower edge of the insulating card 13, whereby the card 13 is also advanced upwardly. The advance of the card 13 against the tension of the supporting spring 22 permits the flexible wire contacts 3 to move up into engagement with the corresponding passive wire contacts 2. This condition is best seen in Figs. 9 and 7.

It will be noted that only one connection has been established since at only one contact point are both of the flexible fingers 36 and 37 simultaneously positioned in conjunction with the movement of a lever 38 by the C-bar. The connection having been established the A and B bars are no longer required. Consequently, the magnets 32 and 39 may be released, permitting bars 24 and 27 to restore carrying all flexible fingers 36 and 37 not in use back to their normal position. The flexible fingers 36 and 37, however, used in operating the particular card 13 remain in their set position as shown in Fig. 7, due to the maintained operation of the C bar 30. It will be noted that the lever 38 carries two upturned flanges which form a locking engagement with the flexible finger 36 whereby the latter is held after the bar 24 releases. Due to the pressure exerted by the finger 36 on the flexible finger 37 and the fact that the latter rests in a curvature of the former, said finger 37 is likewise prohibited from returning from its normal position when the bar 27 is released.

When the connection is no longer required the switch is restored to its normal condition by the simple act of deenergizing the magnet 33. The magnet 33 releases the connecting rod 53 and all associated bars. The bar 30 in releasing withdraws the lever 38 which disengages the flexible fingers 36 and 37 permitting the same to unflex and return to their normal condition. The release of these flexible fingers restores the insulating card 13 whereby the active contacts are disengaged from the passive contact wires 2.

Figure 11:
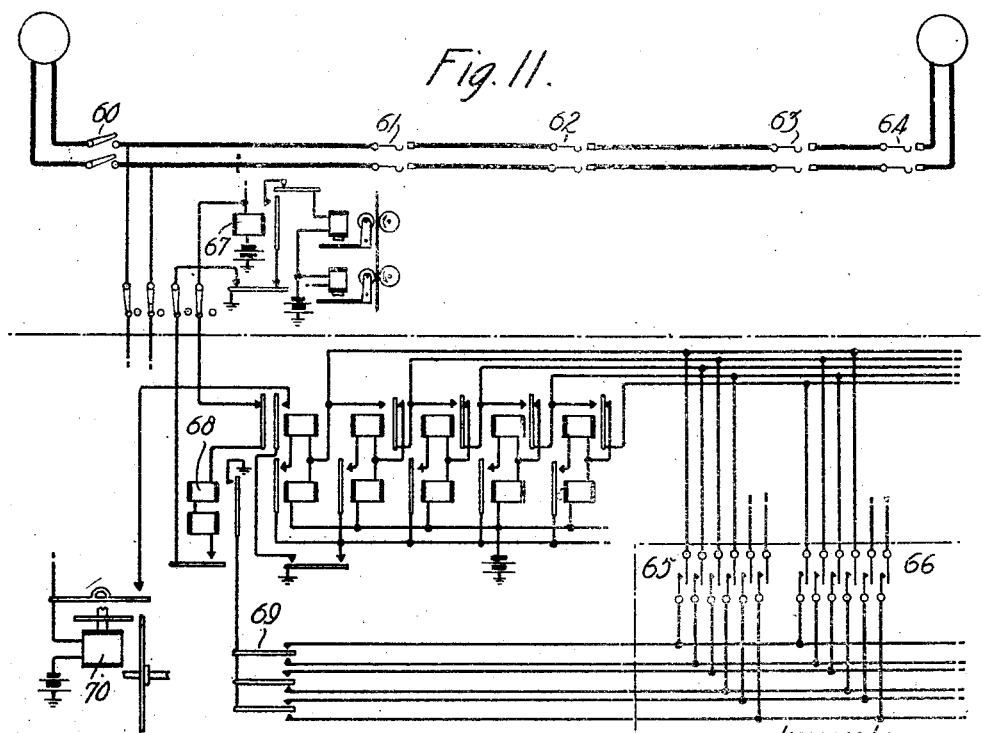
Fig. 11 is a schematic showing of the switching device applied to the control of the automatic selective switches in a telephone system.

A description will now be given of Fig. 11 which illustrates in schematic manner an application of the switching mechanism to the control of automatic selecting switches. This figure represents a telephone exchange system of the character shown in the patent to Stearn and Scudder No. 1,395,977, issued November 1, 1921, wherein provision is made for establishing connections between calling and called lines by means of a line switch 60 and directively operated switches 61, 62, 63 and 64. As fully described in said patent the calling subscriber dials three digits representing the office code which results in the setting of three office registers. These registers may be employed for selecting the operating magnets of the switching structure whereby the proper contact operating bars are positioned as heretofore described. Two sets of contacts 65 and 66 are illustrated in the lower right-hand corner of Fig. 11 belonging to the switch.

The switching mechanism when used in this capacity serves as a translator and cooperates with the counting relay set to control the switches 61 and 62 to extend the connection. As fully described in the patent above mentioned, when the apparatus is in condition to control selection at the switch 61, the fundamental circuit is closed including the relay 67 and the stepping relay 68 of the sender. Relay 68 prepares a circuit over the contacts 69 of the sender sequence switch 70 through contact point 65 of the translator switch and thence to the proper one of the counting relays. In the well-known manner the counting relays are operated to open the fundamental circuit and advance the sender sequence switch at the proper times. It will be observed that with a translator switch having a capacity of a thousand sets of contacts as many different combinations may be had for securing the different selection operations of the automatic switches 61 and 62.

What is claimed is:

1. The combination in a switching device of a set of operating bars divided in groups, a second set of bars divided in corresponding groups, electromagnets arranged each to operate all bars in a group of the first set, other magnets each arranged to operate a different bar in each group of the second set, sets of contacts, and means coacting with the operated bars for selectively operating said contact sets.

2. The combination in a switching device of a set of operating bars divided into groups, a second set of bars divided into groups, a separate magnet for each group of said first mentioned bars, each magnet arranged to operate simultaneously all bars in its group, other magnets each arranged to operate simultaneously a different bar in each of said groups of the second set, contact sets, and means coacting with the operated bars for selectively operating said contact sets.

3. The combination in a switching device of a set of operating bars divided into groups, a second set of bars correspondingly divided into groups, electromagnets one for each of said first groups for operating simultaneously all bars in such groups, other magnets each arranged to operate a different bar in each group of the second set, sets of contact elements, and a third set of bars cooperating with the actuated bars of said first sets for selectively operating said contact sets.

4. The combination in a switching device of a set of operating bars divided into groups, a separate magnet for each group, each magnet arranged to operate all bars in its group, a second set of bars similarly divided into groups, other magnets each arranged to operate a different bar in each group of said second set, passive bare wire contacts, active bare wire contacts, and means coacting with the operated bars for selectively actuating a set of active contacts to make engagement with a set of passive contacts.

5. The combination in a switching device of a set of operating bars divided into groups, a second set of bars correspondingly divided into groups, electromagnets arranged each to operate the bars in a group of the first set, other magnets each arranged to operate a different bar in each group of the second set, sets of bare wire contacts, and a third set of bars coacting with an operated bar of the first set and with the correspondingly operated bar of the second set to selectively operate said contact sets.

6. The combination in a switching device of a plurality of sets of contacts, a plurality of pairs of bars divided into groups, means for operating half of the bars in one group simultaneously, means for operating a single one of the remaining bars in such group, and a single bar in all other groups, and means coacting with the operated bars for selectively operating said contact sets.

7. In combination, automatic switches, a set of operating bars divided into groups, a second set of bars divided into groups, means for operating the bars of a given group of the first set, means for operating a bar in each of the several groups of the second set, a number of circuits for controlling the selective operation of said automatic switches, and means cooperating with said actuated bars for selecting any one of said circuits.

In witness whereof I hereunto subscribe my name this 3d day of July, A. D., 1923.

MARK B. KERR.